(12) United States Patent
Heller et al.

(10) Patent No.: US 7,572,107 B2
(45) Date of Patent: Aug. 11, 2009

(54) ULTRA LOW VOLUME CHEMICAL DELIVERY SYSTEM AND METHOD

(75) Inventors: Larry D. Heller, Osteen, FL (US); Bruce Dorendorf, Winnebago, MN (US); John Travis Douglas, Lake Mary, FL (US)

(73) Assignee: ADAPCO, Inc., Winnebago, MN (US)

( * ) Notice: Subject to any disclaimer, the term of this patent is extended or adjusted under 35 U.S.C. 154(b) by 173 days.

(21) Appl. No.: 11/738,002

(22) Filed: Apr. 20, 2007

(65) Prior Publication Data

US 2008/0262650 A1 Oct. 23, 2008

(51) Int. Cl.
*F04B 49/00* (2006.01)
*G01M 19/00* (2006.01)

(52) U.S. Cl. .............. 417/53; 417/63; 73/168

(58) Field of Classification Search .......... 417/53, 417/63; 73/1.31, 1.36, 168
See application file for complete search history.

(56) References Cited

U.S. PATENT DOCUMENTS

| | | | |
|---|---|---|---|
| 2,012,973 | A | 9/1935 | Parker |
| 2,201,995 | A | 5/1940 | Erickson |
| 3,239,960 | A | 3/1966 | Stevens |
| 3,304,011 | A | 2/1967 | Paasche |
| 3,735,929 | A | 5/1973 | Pleines |
| 3,776,459 | A | 12/1973 | Bonvicini |
| 3,900,165 | A | 8/1975 | Parke et al. |
| 3,917,168 | A | 11/1975 | Tenney |
| 4,116,385 | A | 9/1978 | Waldron |
| 4,125,225 | A | 11/1978 | Venghiattis |
| 4,171,638 | A * | 10/1979 | Coman et al. ............ 73/114.42 |
| 4,182,491 | A | 1/1980 | Parke et al. |
| 4,186,885 | A | 2/1980 | Christian |

(Continued)

FOREIGN PATENT DOCUMENTS

EP 0131120 A1 5/1984

(Continued)

OTHER PUBLICATIONS

Manual for "BOA Flow Control Belt Operated ASP Pump: Instruction Manual with Parts List", Lowndes Engineering Co., Inc., Valdosta, Georgia.

(Continued)

*Primary Examiner*—Charles G Freay
(74) *Attorney, Agent, or Firm*—Dobrusin & Thennisch PC

(57) ABSTRACT

A mobile, real-time system for delivering an aerosol spray to a treatment area while maintaining the fluid within a closed environment for providing maximum personal protection to the operators handling the fluid during the transfer and application of the fluid. The invention includes a spraying device for producing a precise degree of liquid droplet generation on a repeatable basis by combining a specified rate of regulated flow of liquid material with a regulated flow of high-pressure air. The delivery system includes a closed loop system for calibrating a liquid pump, which regulates the flow of liquid within the system. A controller is coupled to the components of the delivery system for control thereof. The operator of the delivery system communicates with the controller through a user interface, which provides the operator with manual and automatic controls of the delivery system, such as the closed environment calibration of the pump and transfer of fluid from an external source to the delivery system.

5 Claims, 3 Drawing Sheets

U.S. PATENT DOCUMENTS

| | | | | |
|---|---|---|---|---|
| 4,331,262 | A | * | 5/1982 | Snyder et al. ............... 222/37 |
| 4,474,327 | A | | 10/1984 | Mattson et al. |
| 4,530,465 | A | * | 7/1985 | Gauchet et al. ............ 239/127 |
| 4,781,329 | A | | 11/1988 | Tenney et al. |
| 4,925,096 | A | | 5/1990 | Gill |
| 5,174,472 | A | * | 12/1992 | Raque et al. ............... 222/1 |
| 5,195,873 | A | * | 3/1993 | Claussen et al. ............ 417/18 |
| 5,248,448 | A | | 9/1993 | Waldron et al. |
| 5,299,737 | A | | 4/1994 | McGinnis et al. |
| 5,340,026 | A | | 8/1994 | Woodruff |
| 5,341,644 | A | | 8/1994 | Nelson |
| 5,392,996 | A | | 2/1995 | Ussery |
| 5,441,297 | A | | 8/1995 | Krohn et al. |
| 5,749,343 | A | | 5/1998 | Nichols et al. |
| 5,873,530 | A | | 2/1999 | Chizinsky |
| 5,878,925 | A | | 3/1999 | Denkins et al. |
| 6,003,787 | A | | 12/1999 | Fisher |
| 6,012,647 | A | | 1/2000 | Ruta et al. |
| 6,079,632 | A | | 6/2000 | Yan |
| 6,206,300 | B1 | | 3/2001 | Roudebush et al. |
| 6,272,790 | B1 | | 8/2001 | Paganessi et al. |
| 6,409,097 | B1 | | 6/2002 | McCauley |
| 6,431,468 | B1 | | 8/2002 | Brown et al. |
| 6,446,881 | B1 | | 9/2002 | You |
| 6,669,105 | B2 | | 12/2003 | Bryan et al. |
| 6,698,461 | B1 | | 3/2004 | Bryan et al. |
| 6,799,740 | B2 | | 10/2004 | Heller et al. |
| 6,805,307 | B2 | | 10/2004 | Dorendorf et al. |
| 6,848,595 | B2 | | 2/2005 | Lange et al. |
| 6,926,211 | B2 | | 8/2005 | Bryan et al. |
| 6,968,871 | B2 | | 11/2005 | Bryan et al. |
| 7,073,734 | B2 | | 7/2006 | Dorendorf et al. |
| 7,143,980 | B2 | | 12/2006 | Heller et al. |
| 7,171,913 | B1 | | 2/2007 | Conrad |
| 7,213,772 | B2 | | 5/2007 | Bryan et al. |
| 2002/0030117 | A1 | | 3/2002 | Bryan et al. |
| 2002/0030119 | A1 | | 3/2002 | Proharam |
| 2003/0132311 | A1 | | 7/2003 | Dorendorf |
| 2004/0194851 | A1 | | 10/2004 | Bryan et al. |
| 2004/0217199 | A1 | | 11/2004 | Bryan et al. |
| 2004/0222318 | A1 | | 11/2004 | Dorendorf et al. |
| 2005/0051669 | A1 | | 3/2005 | Heller et al. |
| 2005/0189036 | A1 | | 9/2005 | Bryan et al. |
| 2007/0040046 | A1 | | 2/2007 | Dorendorf |
| 2007/0194146 | A1 | | 8/2007 | Dorendorf |

FOREIGN PATENT DOCUMENTS

| | | | |
|---|---|---|---|
| WO | 98/07525 | A1 | 2/1998 |
| WO | 98/57753 | A1 | 12/1998 |
| WO | 99/09291 | A1 | 2/1999 |
| WO | 99/15279 | A2 | 4/1999 |
| WO | 99/39834 | A1 | 8/1999 |
| WO | 99/43441 | | 9/1999 |
| WO | 01/51358 | A1 | 7/2001 |
| WO | 01/64352 | A1 | 9/2001 |
| WO | 01/72432 | A1 | 10/2001 |
| WO | 03/049811 | A1 | 6/2003 |

OTHER PUBLICATIONS

Manual for "LECO CV Flow Control with Digital Meter: Manual Supplement for Digital Meter Effective Serial No. 6700756—up", Lowndes Engineering Co., Inc., Valdosta, Georgia.

Manual for "LECO CV-E Flow Control with Digital Meter: Manual Supplement for Digital Meter Effective Serial No. 6900192—up", Lowndes Engineering Co., Inc., Valdosta, Georgia.

Manual for "LECO CV Flow Control: Instruction Manual and Parts List", Lowndes Engineering Co., Inc., Valdosta, Georgia.

Manual for "LECO ULV FOG Generator Model HD", Lowndes Engineering Co., Inc., Valdosta, Georgia.

Manual for "LECO Model P-1 ULV Fog Generator: Instruction Manual and Parts List", 1989, 1991, Lowndes Engineering Co., Inc., Valdosta, Georgia.

Manual for "Model Mini II ULV Fog Generator: Instruction Manual and Parts List", 1990 Lowndes Engineering Co., Inc., Valdosta, Georgia.

Manual for "Model 500 ULV Fog Generator: Instruction Manual and Pats List", Lowndes Engineering Co., Inc., Valdosta, Georgia.

Textbook titled "Lowndes Engineering Co., Inc. Equipment School: Quality is Economy", Lowndes Engineering Co., Inc., Valdosta, Georgia.

Copending U.S. Appl. No. 12/134,749, filed Jun. 6, 2008.

* cited by examiner

ULTRA LOW VOLUME CHEMICAL DELIVERY SYSTEM AND METHOD

FIELD OF INVENTION

The present invention relates generally to improved devices, systems, and methods for the application, (e.g., spraying or otherwise), of liquids to desired regions. The present invention further relates to devices, systems, and methods for transferring liquid from a first storage tank to a second storage tank while maintaining an environmentally closed system. The present invention, also relates to device systems and methods for calibrating a spraying system for the efficient and safe application of liquid materials.

BACKGROUND OF THE INVENTION

Mobile fluid application devices, (such as spraying devices), typically are manually operated and controlled from the spraying device itself to ensure suitable fluid dispersion according to State and Federal Regulations and manufacturers' suggestions. This requires constant interaction between the operator and the spraying device, which may require either an assistant or the user to constantly adjust the spray device at the point of dispensing. Furthermore, this requires the user, (or assistant), to be exposed to the dispensed fluids from the spraying device, which may or may not include harmful chemicals. Accordingly, there is a need to provide and ensure proper dispersion of the fluids without constant interaction between the spraying device itself at the point of fluid dispersion.

In another aspect, mobile fluid application devices typically require the use of local fluid storage containers for providing a continuous supply of the fluid to a spraying device. This requires periodical refilling of the local fluid storage container from a fluid source, such as a filling station or otherwise. However, during the transfer of the liquid from the fluid source to the local fluid container it is possible that the liquid and/or gas, therein, escape. This loss of liquid and gas not only increases the operating cost of the spraying device and/or the supplier of the liquid, but also exposes the users or persons about the filling station to these liquids and/or gases. Accordingly, there is also a need to conserve the liquid and minimize exposure of these liquid and gases.

In still another aspect, to ensure proper dispersement of fluids through the spraying device it may be necessary to calibrate the spraying device prior to, during, or after spraying. This requires periodic measurement of the liquid flow to the spraying device. As previously mentioned, this may require continuous access of the spraying device and potential exposure to the liquid and/or gas. Accordingly, there is also a need for the calibration of such fluid spraying devices.

The present invention overcomes these and all shortcomings of prior systems by providing improved fluid dispensing devices and methods, which provide for accurate dispensing without necessary exposure to the liquids and/or gases dispersed therethrough.

SUMMARY OF THE INVENTION

The present invention improves on the prior systems by providing systems and methods for spraying fluid to the surrounding areas of a fluid delivery device. The fluid delivery device ensures constant optimal spray characteristics, (e.g., liquid and gas flow rates, particle size, or otherwise), without unnecessary interaction, (and exposure), of the user with the fluid delivery device.

In one aspect, the present invention provides a chemical delivery system comprising a blower to introduce a regulated air flow, a pump in communication with a storage receptacle to introduce a regulated liquid flow, a nozzle for dispersing a fluid mixture, and a controller for controlling the liquid flow and air flow.

In another aspect, the present invention provides a method for transferring a liquid from a source tank to a storage receptacle of the chemical delivery system comprising the steps of providing a controller for controlling a liquid flow from a source tank to a storage receptacle, connecting the source tank to the storage receptacle, sensing a liquid level in at least one of the source tank and storage receptacle, providing a user interface for communicating with the controller, selecting a preset condition from the user interface, and initiating the transfer of the liquid from the source tank to the storage receptacle.

In another aspect, the present invention provides a method for calibrating a pump in a closed system comprising the steps of providing a pump in communication with a storage receptacle, a nozzle, a transparent calibration tank, and a valve manifold having a plurality of diverter valves, de-energizing and/or energizing selected valves to divert liquid flow to the liquid calibration tank for a predetermined time period, de-energizing and/or energizing selected valves to divert flow from the inlet of the transparent calibration tank at the end of the predetermined time period, read and record the measured amount of liquid in the transparent calibration tank, and de-energizing and/or energizing selected valves to divert liquid flow out of the transparent calibration tank.

It should be appreciated that other inventive features exist with the present invention as shown and/or discussed herein. Furthermore, it should be appreciated that certain features and certain embodiments described above or otherwise herein may be combined with other embodiments.

DETAILED DESCRIPTION OF THE PRESENT INVENTION

Figure 1:
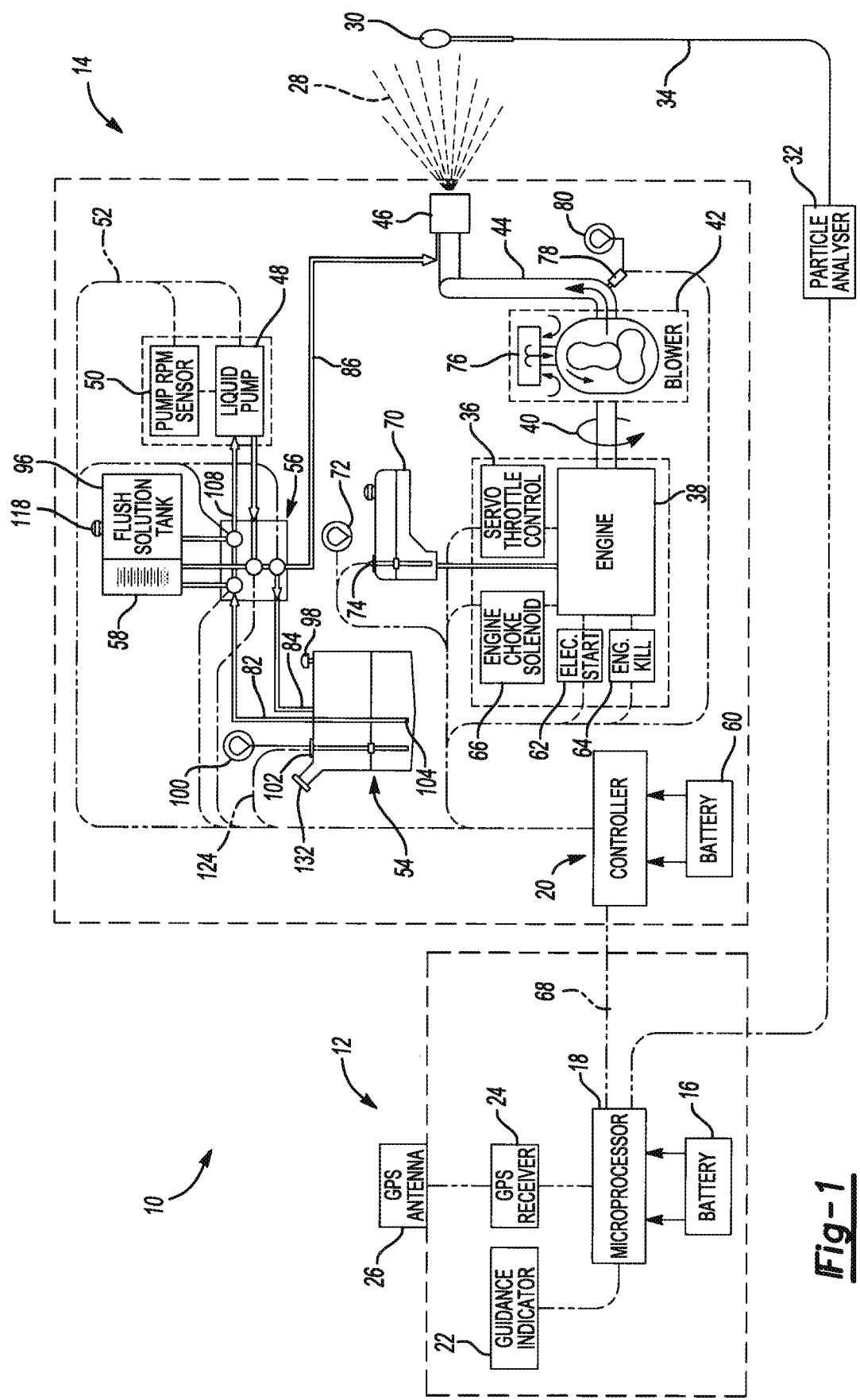
FIG. 1 illustrates a block diagram of one fluid delivery device according to the teachings of the present invention.

A number of advantages are realized in accordance with the present invention, including, but not limited to, the ability to deliver and apply a liquid atomized spray to targeted portions of the ambient environment.

The ultra low volume, (ULV), chemical delivery system of the present invention is designed specifically for applying pesticides, insecticides, or other selected chemical compound in a very fine particle to conform to the chemical manufacturer's label, which is approved only by the Environmental Protection Agency, (EPA). The particulate size should remain within conformity throughout the full vehicle speed range in combination with the flow of the liquid and the air pressure supplied to the nozzle in proportion to that vehicle speed. As such, the liquid flow rate increases or decreases as the velocity of air increases or decreases in proportion to maintain a consistent droplet size throughout the flow range.

The chemical delivery system additionally comprises a ULV cold fog generator for delivering the spray application and a transport vehicle, such as car, truck or otherwise, preferably a vehicle having a platform such as to position the ULV cold fog generator on a truck bed. There are no controls on the actual ULV cold fog generator, but rather on the user interface, which is a remote unit, located inside the vehicle, such as within the cab of a truck.

The present invention improves on the current chemical delivery system so as to include a remote onboard computer, (user interface), that interfaces with several aspects of the ULV chemical delivery system including the closed transfer of liquid from an external source to the ULV chemical delivery system, the liquid flow and the air flow to the integrated nozzle, the liquid pump calibration in combination with the particle detector, and cleaning process utilizing a flush solution.

The user interface includes an embedded operating system software and internal memory for storing chemical reference databases and recorded system calibration data. The user interface provides the operator communication with the ULV chemical delivery system as well as security against unwanted and undesired elements who may seek to use this equipment for uses such as in terrorist efforts. To prevent unwanted use of the ULV chemical delivery system, the user interface contains password protection to access control thereof.

Further, the ULV chemical delivery system is designed to be a closed, (to liquid), loading system thereby internally retaining liquid supplied from an external source container and transferred to a target storage receptacle on the ULV cold fog generator, as outlined for certain groups of pesticides in the Food Quality Protection Act, (FQPA), legislated in 1998. The FQPA provides a safe way to fill or refill an insecticide tank on a ULV delivery system without the possibility of spills or overflowing. In addition to the closed-loading system, the ULV chemical delivery system provides a "closed calibration" of the liquid pump for liquid flow rate calibration. This closed calibration accomplishes the same visual calibration and verification as is currently found in present day calibration processes, however, the liquid in the present invention remains contained within the ULV chemical delivery system at all times.

The federal, state, or local sanctioning body requires regular calibration of chemical delivery systems. For particle size verification, the ULV chemical delivery system of the present invention is additionally designed for communication between the user interface and the particle detector for measuring droplet size. By first knowing the acceptable drop limits of a particular liquid product, the remote user interface can control the liquid pump and/or engine throughout the full speed and flow range to produce the desired droplet size. The droplet calibration set points are stored away in the internal memory of the user interface and called upon while in the flow control mode while the particle detector is disconnected to disperse droplet sizes corresponding to the liquid and gas flow rates used during the calibration mode as discussed below. The particle detector is only used during the particle calibration mode of the ULV cold fog generator.

With reference to FIG. 1, one embodiment of the present invention is there shown and includes an ultra low volume, (ULV), chemical delivery system 10, which is able to produce a precise degree of liquid droplet generation on a repeatable basis by combining a specified rate of regulated flow of a liquid material with a targeted and regulated flow of high-pressure air.

The ULV delivery system 10 is composed of several major components such as a user interface 12 and a ULV cold fog generator 14. The operator of the chemical delivery system 10 controls the ULV cold fog generator 14 from the cab of the truck through the user interface 12, which is in communication with the controller 20 of the ULV cold fog generator 14. The controller 20 controls the several components of the ULV cold fog generator as well as provides feedback to the user interface, thereby, displaying to the operator, the current operating status of the ULV chemical fog generator 14.

The user interface 12 includes an onboard computer having a power source 16 and a microprocessor 18 embedded with internal memory and an operating system such as Microsoft Windows XP®, Macintosh OS X®, UNIX Linux®, or otherwise. The power source 16 may derive from the vehicle battery, a battery contained within the user interface, or otherwise. In one embodiment, the power source 16 is a 12-volt battery. In one embodiment, the user interface 12 may be configured to interface with external components using input/output (I/O) devices, ports, and networking, which improves the expandability of the user interface 12. An operator is able to interact with the user interface 12 through typical types of I/O, which include but are not limited to a monitor, a keyboard, a mouse, a keypad, a touch-screen display, removable storage, and/or otherwise. The removable storage devices allow the operator to add new information to the user interface 12 as well as transfer information from the user interface to the removable storage to carry to a different location. Suitable removable data storage devices include disc drives, ScanDisc, Compact Flash, MicroDrive, Smart Media Card, MultiMedia Card, Memory Stick, Secure Digital Card, Radio Frequency Identification (RFID), or otherwise.

The user interface 12 may also be configured to interface with external components through data ports such as parallel, serial, universal serial bus (USB), firewire, or otherwise. The user interface 12 may include at least one data port, but preferably more than one.

Additionally, the user interface 12 may be configured to interface with external components through the internet/network. In one embodiment, the user interface 12 further comprises at least one networking component, which may include a modem, a local area network (LAN) card, a wireless adapter (as discussed below), BLUETOOTH® technology, a cable modem, a digital subscriber line (DSL), very high bit-rate DSL (VDSL) modem, or otherwise.

The user interface 12 contains a reference database of chemical products including their respective acceptable droplet limits, which may be visually displayed to the ULV delivery system operator. The operator can view system information such as flow rates, liquid and gas levels, air pressure and/or other important data. The operator is also able to control many aspects of the ULV delivery system by manually entering system changes into the user interface 12. Such system changes are reflective of the liquid and gas flow rates, the liquid transfer from an external pump station to the chemical delivery system, the calibration of the ULV chemical fog generator, the flushing of the liquid transfer lines, or otherwise.

The user interface 12 communicates with the controller 20 of the ULV cold fog generator by way of the control line 68. The controller 20 controls the ULV delivery system 10 through relays, analog/digital converters, switch inputs PWM controllers for unidirectional or bidirectional motor controls, timers and/or counters, which are in communication with the components of the ULV chemical delivery system 10. The user interface 12 further includes a visual and/or audio reference guidance indicator 22, and a GPS receiver 24 having a GPS antenna 26, which is preferably located on the roof of the vehicle containing the ULV delivery system 10. The GPS assembly in combination with the guidance indicator provides visual and/or audio reference to information such as the vehicle's position and speed, which the user interface 12 can visually display. The GPS assembly provides vehicle location, which may be illustrated in an aerial map that is displayed on the user interface. The guidance indicator utilizes the real-time location of the vehicle to enable the operator to track the spraying of the aerosol with respect to the desired spray location. More specifically, the GPS assembly in combination with the guidance indicator helps the operator determine which areas of the desired spray location have received the aerosol to ensure complete coverage the desired spray location and to further ensure that portions of the desired spray location have not received additional aerosol coverage.

In one embodiment, the user interface 12 further includes wireless networking, such as, a wireless adapter (WiFi, 802.11, BLUETOOTH® technology) and/or otherwise. Wireless networking enables the operator to access an external location for improved functionality of the ULV chemical delivery system 10. Improved functionality includes upgrading the user interface 12 by downloading data from a remote location. Suitable data includes updated software such as the operating system software, the mapping for the GPS, the reference database for the approved droplet ranges, and/or otherwise. The operator may also upload information to a remote location such as the calibration data for the liquid pump, the calibration data from the particle detector, and/or otherwise.

The user interface 12 contains predetermined criteria provided within a reference database to applicable regulations and/or manufacturer's specifications for the specific liquids in use. The user interface 12 can achieve real-time closed loop control of the size of fog particles 28 by comparing the stored reference database of allowable particle sizes for the specific liquid in use to a stored droplet calibration point as taken from a particle detector 30 during a particle size calibration. The particle size calibration utilizes the particle detector 30, which is in communication with a particle analyzer 32 through a cable 34 and is connected to the ULV cold fog generator 14 while the vehicle remains in a stopped position. The operator initiates the flow control mode of the ULV cold fog generator, which begins liquid and gas flow to the integrated nozzle 46. The operator adjusts the liquid and/or gas flow rates at different intervals until a desired liquid and gas flow rate is obtained. The liquid and gas flow to the integrated nozzle 46 and exit therefrom as an aerosol, wherein the aerosol interacts with the particle detector, which measures the particle size of the aerosol.

The particle analyzer 32 converts the measured particle size determined by the particle detector into an electrical signal and stores the measurement as a droplet calibration point in the user interface 12. The measured particle size is compared to the reference database to determine if the measured particle size is within the allowable particle size range from the reference database for the specific liquid in use. If the measured particle size is within the referenced allowable sizes for the specific liquid being tested, the liquid and gas flow rates are stored in the user interface for future applications using the tested liquid.

To achieve the real-time closed loop control of the fog particles 28, the user interface 12 utilizes the stored particle calibration points for a specific liquid that is to be used during the normal flow control mode. The user interface 12 can extrapolate an "assumed" particle size for different liquid and/or gas flow rates that will be used during the normal operation of the ULV cold fog generator 14. The user interface 12, can additionally adjust the stored droplet calibration points to accommodate for vehicle speed.

During the normal flow control mode and while the particle detector 30 is disconnected, the stored droplet calibration points are called upon for dispersing droplets with respect to the liquid in use and the flow rates of the liquid and the gas. The desired liquid flow rate to be applied to the integrated nozzle 46 is achieved by another closed-loop subsystem. The user interface 12 calculates the desired flow rate based upon the vehicle speed, vehicle geographical position determined from the GPS antenna 26, and the desired liquid concentration based on the spray area and the weather conditions determined from sensors for temperature, wind velocity, and humidity. The user interface 12 processes this data to determine if any spray changes are required. If changes in the spray conditions are required, the user interface 12 communicates with the controller 20, which then sends an electrical signal to specific components of the ULV delivery system 10 to vary the fog particle size by changing one or both of the flow rates. If necessary, the droplet size is altered by the controller 20, as discussed below.

In one embodiment, the ULV chemical delivery system 10 further includes a meteorological component, (not shown), which will be in communication with the user interface 12. The meteorological component provides real-time weather updating at about 0.25 Hz to about 2 Hz, preferably, about 0.5 Hz to about 1.5 Hz with wind speed, wind direction, temperature, relative humidity, and dew point. There are several benefits that this real-time weather information can provide and like the EPA label restrictions on droplet size per product, there are also restrictions regarding environmental conditions that must be met in order to apply an aerosol chemicals.

In yet another embodiment, the user interface includes aerial drift technology to predict the path of the aerosol exiting the integrated nozzle during various weather conditions. The drift technology derives from computer models based on aerosol released from actual drift tests using real-time weather. The user interface may also include set parameters such as "spray or not spray" based on allowable weather conditions as set forth in the EPA label for individual chemicals. More specifically, if the real-time weather conditions fall outside the allowable weather conditions as set forth by the EPA label for the chemical being applied, the user interface will communicate to the controller to halt the aerosol application to the desired spray area. Once the real-time weather is permissible within the allowable spray conditions, the user interface will re-activate the ULV cold fog generator using the controller.

Utilizing real-time weather updates along with the drift technology, the ULV chemical delivery system can safely and efficiently disperse aerosol to a desired spray location during various spray conditions. As such, the user interface, in constant communication with the system controller, can continually adjust the ULV cold fog generator to accommodate the ever-changing conditions surrounding the application of the aerosol including, but not limited to changing weather conditions and vehicle speed.

The ULV cold fog generator 14, (FIG. 1), includes a controller 20, an engine 38, a blower 42, a storage receptacle tank 54 with attachments, a calibration tank 58, a valve manifold 56, a liquid pump 48, and an integrated nozzle assembly 46. The controller 20 may be located in the ULV cold fog generator 12 of the delivery system 10, which is positioned on the bed of a truck. The controller 20 has a power source 60 and is in communication with the components of the delivery system 10. In one embodiment, the power source 60 is a 12-volt battery, such as the vehicle battery or otherwise.

The engine 38 is preferably a gasoline internal combustion engine; however, it is contemplated that other power sources such as hydraulic, air, diesel, solar, and electric, or otherwise engine may be used. The operator of ULV delivery system 10 initiates the engine 38 by selecting specific inputs, which may be predetermined presets within the user interface 12, which is in communication with the controller 20 for controlling the engine 38. As such, the controller 20 automatically controls the engine 38 utilizing its electric start switch 62, electric kill switch 64, choke solenoid 66, or can adjust the engine output power via the engine servo throttle control 36, all in communication with the controller 20. In one embodiment, a servo motor is used which enables the operator to control the throttle 36 to any position within the engines normal range. The benefits of this control allows a smoother ramp up or down of the engine output on command and, the ability to use one actuator to accomplish both throttle and choke control.

The ULV cold fog generator 14 further includes a fuel tank 70 having a fuel gage 72, for visually measuring the amount of fuel in the fuel tank 70, and a volume sensor 74. The volume sensor 74 may comprise of a float, usually made of foam, connected to a thin metal rod. The end of the rod is mounted to a variable resistor. The variable resistor consists of a strip of resistive material connected on one side to the ground. A wiper connected to the gauge slides along this strip of material, conducting the current from the gauge to the resistor. As the level in the tank changes, the float raises or sinks, and respectively, a current is sent back to the controller 20, which in turn, communicates with the user interface 12 where the fuel level of the gas tank 70 is displayed. Additionally, the volume sensor visually displays the fuel level on the fuel gage 72.

The engine 38, (FIG. 1), in combination with the blower 42, supplies high-pressure air to the integrated nozzle assembly 46. This high-pressure air travels to the integrated nozzle assembly 46 through an air supply pipe 44. The air supply pipe 44 is connected to the blower 42, which is driven by the rotating shaft 40 of the engine 38. The blower 42 further includes a filtered vent 76 to draw outside air into the blower 42 for operation thereof.

The output air flow of the blower 42 is directed through a pressure sensor 78 creating a single air supply flowing to the integrated nozzle assembly 46 via piping 44. The air supply from the blower 42 is directed toward a pressure sensor 78, which is in communication with and provides pressure readings to the controller 20. As such, the controller 20 determines if the pressure reading corresponding to the air flow rate to the integrated nozzle 46 for atomization is within the desired range of air flow rates. If necessary, the air flow is adjusted by the controller 20, which changes the level of the electrical signal to the servo throttle control 36 of the engine 38.

In response to the change in the electrical level input to the servo throttle control 36, the engine 38 increases or decreases the rotation rate of the shaft 40. Increases or decreases in rotation of the shaft 40 adjusts the volume of air flow generated by the blower 42, which is in communication with the shaft 40. The blower 42 pushes the generated volume of air through the piping 44 to the integrated nozzle 46. This increase or decrease of air volume in addition to the liquid flow being supplied to the integrated nozzle 46, directly changes the size of the fog particles 28. Throughout the adjustment of the air flow rate, the controller 20 provides the user interface 12 with the pressure readings from the pressure sensor 78, which can viewed by the operator. Additionally, the operator can determine the air pressure to the integrated nozzle 46 by locating the air pressure gage 80 on the ULV cold fog generator 14, which visually displays the pressure measured by the pressure sensor 78.

The controller 20 may also control the droplet size by sending an electrical signal to the liquid pump 48 via the control line 52 to force liquid from the storage receptacle 54 through the valve manifold 56 and to the integrated nozzle 46. Similar to the adjustment of air flow to the integrated nozzle 46, the controller 20 determines the liquid flow rate from the liquid pump 48 based upon the electrical signals received from the pump rpm sensor 50, which detects the revolutions of the pump shaft. The electrical signals communicated to the controller 20 from the pump rpm sensor 50 represent the rpm output of the liquid pump 48, which corresponds to the flow rate of the liquid being pumped. If the corresponding liquid flow rate sensed by the rpm sensor 50 is equivalent to the desired liquid flow rate, the controller 20 continues the liquid flow at the corresponding/desired liquid flow rate by maintaining the rpm output of the liquid pump 48. However, if the corresponding liquid flow rate differs from the desired liquid flow rate, the controller 20 adjusts the liquid pump 48 by increasing or decreasing the rpm output until the pump rpm sensor 50 relays an equivalent pump rpm output to the controller 20, which corresponds to the desired liquid flow rate. Once the corresponding liquid flow rate reaches the desired liquid flow rate, the controller 20 stops adjusting the liquid pump. As such, the pump rpm sensor 50 and the controller 20 are in constant communication with each other to control the operation of the liquid pump 48 and to maintain the desired liquid flow rate. Throughout the adjustment of the liquid flow rate, the controller 20 provides the user interface 12 with the liquid pump rpm output readings from the pump rpm sensor 50, which can viewed by the operator from the user interface 12.

The controller 20 controls the liquid flow rate loop subsystem independently of the size of fog particles 28. This is achieved because the conversion of liquid to fog particles 28 is almost independent of the air flow changes required for particle size control. By combining both liquid and air forces in the manner described below, the ULV delivery system 10 is able to successfully achieve suitable flow rates, high liquid formulation output, and consistent droplet formation, based upon needs and/or requirements.

Incorporated into the liquid transfer lines of the ULV chemical delivery system 10 is a valve manifold 56 for diverting liquid flow from the storage receptacle 54 to the integrated nozzle 46 by energizing a plurality of diverter valves within the valve manifold 56. The valve manifold 56 is connected to the storage receptacle 54 via the liquid supply line 82 and the liquid return line 84 and to the integrated nozzle assembly 46 via the liquid exit line 86.

The valve manifold 56, (FIGS. 1-3), contains a plurality of diverter valves for directing liquid flow to a target within the liquid supply line. The ability to divert liquid flow within the ULV chemical delivery system allows for the calibration of the liquid pump, the flushing of the liquid transfer lines, the delivery of the liquid to specific components of the system, and otherwise.

In another embodiment, the valve manifold 56, (FIG. 3), includes four 3-way diverter valves, 88, 90, 92, and 94, which aid in diverting liquid flow to and from the storage receptacle 54, the calibration tank 58, the flush solution tank 96, the liquid pump 48, and the integrated nozzle 46. The liquid storage receptacle 54 contains a tank vent 98 to allow for bidirectional airflow, a liquid level gage 100, and a liquid volume sensor 102. The liquid volume sensor 102 creates an electrical signal corresponding to the liquid level in the storage receptacle 54 and transmits the electrical signal to the controller 20. The controller 20 then communicates with the user interface 12, which visually displays the liquid volume in the storage receptacle 54. The liquid volume sensor 102 is in communication with the liquid gage 100, which is located on the ULV cold fog generator and additionally displays the liquid volume in the storage receptacle 54.

Figure 3:
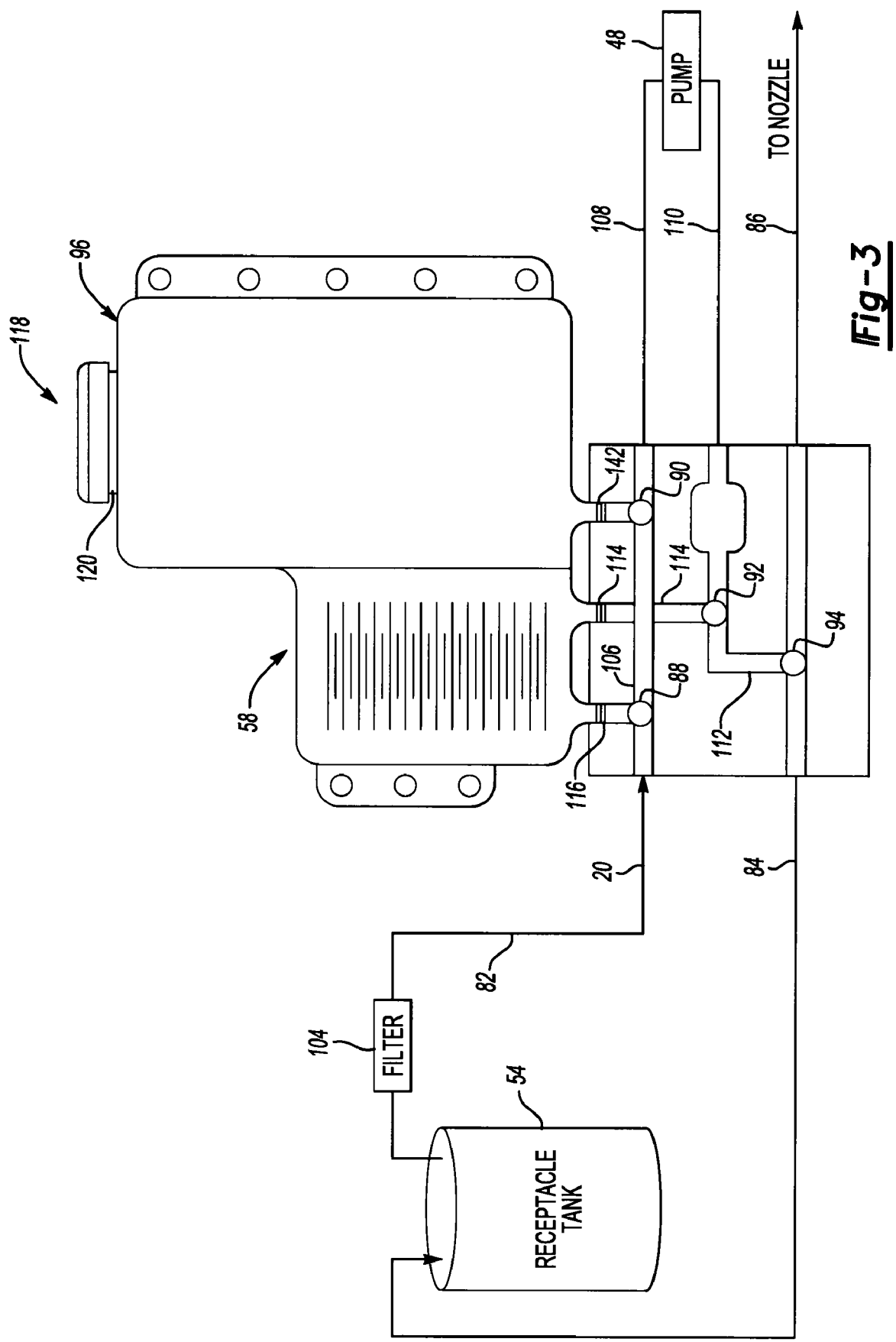
FIG. 3 illustrates a block diagram illustrating a fluid calibration system according to the teachings of the present invention.

The storage receptacle 54 utilizes a suction feed supply line 82 with preferably a filter screen 104 in line to eliminate debris from entering the liquid supply line 82. The feed supply line 82 is connected to the diverter valve 88, (FIG. 3), which when energized, continues the flow of liquid through the diverter supply line 106 to the diverter valve 90. When energized, the diverter valve 90 continues the liquid flow to the liquid pump 48 via the pump supply line 108, where upon exiting the liquid pump 48; the liquid flow is fed to the diverter valve 92 via the pump return line 110. When the diverter valve 92 is energized, the liquid flow continues through the diverter valve 92 to the last diverter valve 94 via the diverter return line 112. Upon entering an energized diverter valve 94, the liquid flow is diverted to the integrated nozzle 46 via the liquid exit line 86.

In the energized positions, the diverter valves 88, 90, 92, and 94, (FIG. 3), define a liquid flow that is illustrative of a typical liquid flow route from the storage receptacle 54 to the integrated nozzle 46 for dispensing the aerosol. More specifically, the liquid pump draws liquid from the storage receptacle 54 through liquid supply line 82 to the energized diverter valve 88. The liquid flows through the energized diverter valve 88 through the diverter supply line 106 to the energized diverter valve 90. After the liquid flows through the energized diverter valve 90, the liquid is drawn to the liquid pump 48 through the pump feed line 108. The liquid exits the liquid pump 48 and flow through the pump return line 110 to the energized diverter vale 92, wherein the liquid is diverter to the energized diverter valve 94 through the diverter return line 112. Once diverted through the energized diverter vale 94, the liquid flows through the liquid exit line 86 where it enters the integrated nozzle 46 and is dispersed into the environment.

Upon de-energizing specific diverter valves, the liquid flow is diverted to the other components of the ULV cold fog generator 14. For example, in one embodiment during the first step of the pump calibration mode, the typical liquid flow route to the integrated nozzle 46 is diverted from the de-energized diverter valve 94 to the storage receptacle 54. More specifically, upon activation of the liquid pump 48 the liquid flow is continuously drawn from the storage receptacle 54 through the typical flow route until the liquid flow reaches the diverter valve 94. Once the liquid flow reaches the de-energized diverter valve 94, the liquid flow is diverted back to the storage receptacle 54 via the receptacle return line 84 and away from the liquid exit line 86 to establish a positive flow within the closed liquid system.

In the second step, the liquid pump 48 is set to a “high cal” voltage of approximately 8-volts, which produces a relatively high liquid flow rate. The diverter valve 92 is de-energized to divert the liquid flow from the pump return line 110 to the calibration tank 58 via the calibration tank feed line 114, thereby halting liquid flow to the diverter return line 112. The controller 20 will maintain this condition for 60 seconds. At the end of the 60-second interval, the diverter valve 92 is energized while valve 94 remains de-energized to divert liquid flow to the diverter return line 112, through the de-energized diverter valve 94 and back to the receptacle tank 54 via the diverter return line 112 and the receptacle return line 84, respectively. Thereafter, the operator of the ULV chemical delivery system visually reads the “high cal” volume trapped in the calibration tank 58 and enters the “high cal” volume into the user interface 12 to be stored into memory.

In the third step, the diverter valve 88 is de-energized and the trapped liquid volume in the calibration tank 58 is drained back to the valve manifold via the calibration tank return line 116, through the diverter valve 88, and into the diverter supply line 106. The diverter valve 88 remains de-energized while the pump is running at the same “high cal” 8-volt rate for at least 60 seconds plus some additional time to ensure that the calibration tank 58 is empty. Once the calibration tank 58 is emptied, the diverter valve 88 is energized and the liquid from the storage receptacle is drawn into the valve manifold via the receptacle feed line 82 to establish the positive liquid flow once again.

In the fourth step, the pump 48, (FIG. 3), is set to a “mid cal” voltage of approximately 4-volts, which produces a relatively medium liquid flow rate. The diverter valve 92 is de-energized to divert the liquid flow from the pump return line 110 to the calibration tank 58 via the calibration tank feed line 114, thereby halting liquid flow to the diverter return line 112. The controller 20 will maintain this condition for 60 seconds. At the end of 60 seconds, the diverter valve 92 is energized while the diverter valve 94 remains de-energized to divert the liquid flow to the diverter return line 112, through the de-energized diverter valve 94 and back to the storage receptacle 54 via the diverter return line 112 and the receptacle return line 84, respectively. Thereafter, the operator of the ULV chemical delivery system visually reads the “mid cal” volume trapped in the calibration tank 58 and enters the “mid cal” volume into the user interface 12 to be stored into memory.

In the fifth step, the diverter valve 88 is de-energized and the trapped liquid volume in the calibration tank 58 is drained back to the valve manifold via the calibration tank return line 116, through the diverter valve 88, and into the diverter supply line 106. The diverter valve 88 remains de-energized while the pump is running at the same “mid cal” 4-volt rate for at least 60 seconds plus some additional time to ensure that the calibration tank 58 is empty. Once the calibration tank 58 is emptied, the diverter valve 88 is energized and the liquid from the storage receptacle is drawn into the valve manifold via the receptacle feed line 82 to establish the positive liquid flow once again.

In the sixth step, the pump 48, (FIG. 3), is set to a “low cal” voltage of approximately 2-volts, which produces a relatively low liquid flow rate. The diverter valve 92 is de-energized to divert the liquid flow from the pump return line 110 to the calibration tank 58 via the calibration tank feed line 112, thereby halting liquid flow to the diverter return line 112. The controller 20 will maintain this condition for 60 seconds. At the end of 60 seconds, the diverter valve 92 is energized while the diverter valve 94 remains de-energized to divert the liquid flow to the diverter return line 112, through the de-energized diverter valve 94 and back to the storage receptacle 54 via the diverter return line 112 and the receptacle return line 84, respectively. Thereafter, the operator of the ULV chemical delivery system visually reads the “low cal” volume trapped in the calibration tank 58 and enters the “low cal” volume into the user interface 12 to be stored into memory.

In the seventh step, the diverter valve 88 is de-energized and the trapped liquid volume in the calibration tank 58 is drained back to the valve manifold via the calibration tank return line 116, through the diverter valve 88, and into the diverter supply line 106. The diverter valve 88 remains de-energized while the pump is running at the same “low cal” 2-volt rate for at least 60 seconds plus some additional time to ensure that the calibration tank 58 is empty. Once the calibration tank 58 is emptied, the diverter valve 88 is energized and the liquid flow from the storage receptacle is drawn into the valve manifold via the receptacle feed line 82 to establish the positive liquid flow once again. Once the "high cal," mid cal," and "low cal" volumes have been visually taken, entered into the user interface 12, and stored, the liquid pump calibration is complete. Following the liquid pump calibration, the liquid pump 48 is set to a desired voltage, the diverter valves 88, 90, 92, and 94 are in there energized positions, and the typical liquid flow route to the integrated nozzle 46 is reestablished.

In one embodiment, the stored data as determined from the liquid pump calibration is utilized for environmental audits from the local, Federal, and/or other governing agencies that regulate and oversee the application of specific liquids. When an audit occurs, the operator can provide the calibration information to the governing agency to show that the ULV chemical delivery system has been calibrated, (which may be required periodically), and is within regulations.

Referring back to FIG. 1, the ULV cold fog generator includes a flush solution tank 96, which is connected to the diverter valve 90 via the solution feed line 142. The flush solution tank 96 has a cap 118 over the tank manifold 120, (FIG. 3), which in combination create a sealed environment. The flush solution is supplied to the flush solution tank via the tank manifold 120 and is adapted for cleansing the liquid transfer lines. Cleansing the liquid transfer lines minimizes contamination of a new liquid when the ULV cold fog generator uses a different liquid from spray application to spray application. During the flush mode, the diverter valve 90 is de-energized, which allows the flush solution to drain from the flush solution tank 96 via the solution feed line 142, through the de-energized diverter valve 90, and into the pump feed line 108. Thereafter, the flush solution may be diverted to the pump calibration tank 58, the integrated nozzle 46, or the storage receptacle 54, by way of energizing or de-energizing the diverter valves 88, 92, or 94, to flush out the previously used liquid in the ULV cold fog generator 14. Once the ULV cold fog generator 14 has completed the flush mode, the diverter valve 90 is energized as well as any other diverter valve that was de-energized during the flush mode to reestablish the typical liquid flow route, thereby preparing the ULV cold fog generator 14 for a new liquid.

Figure 2:
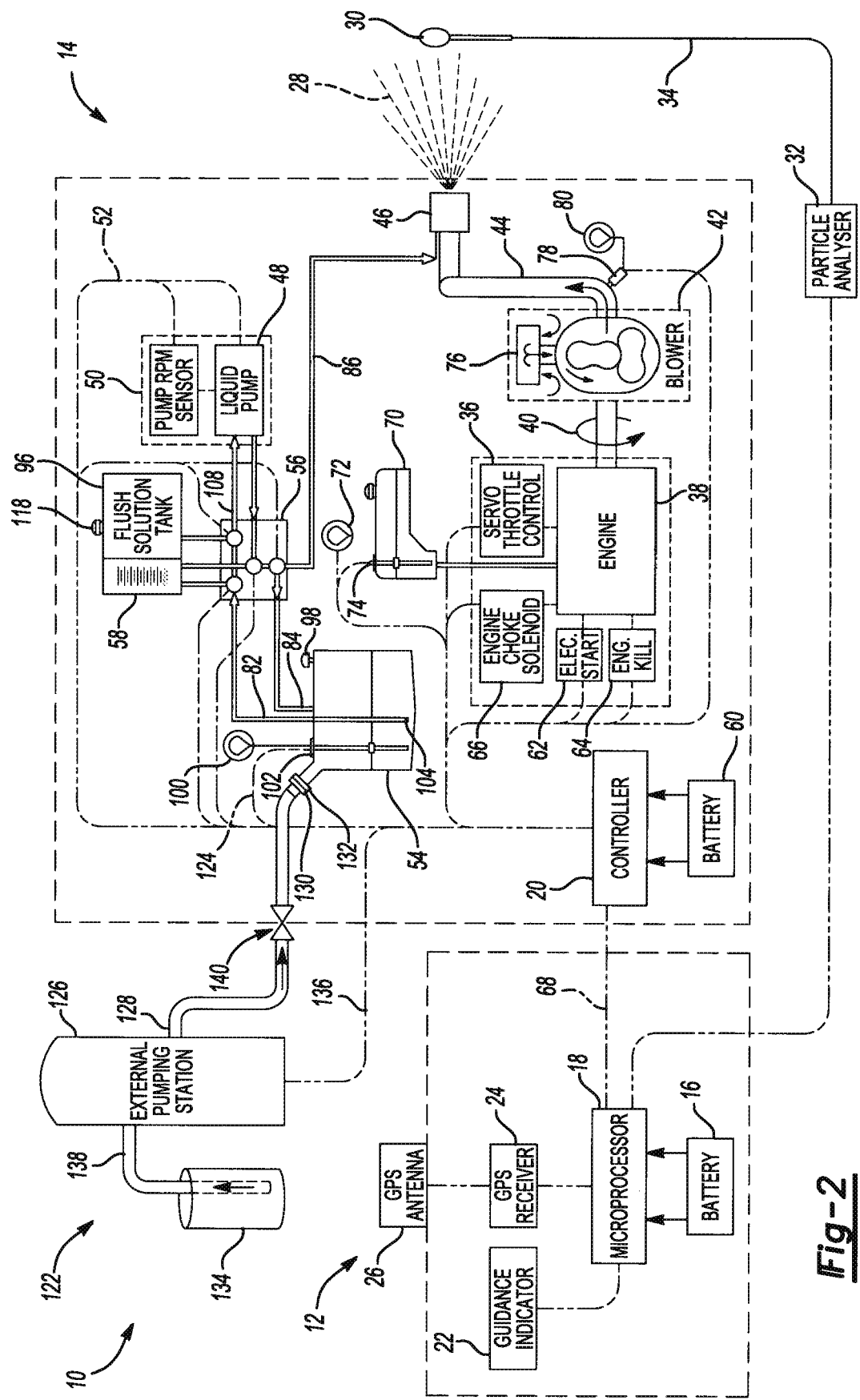
FIG. 2 illustrates a block diagram of a closed loading transfer system according to the teachings of the present invention.

With reference to FIG. 2, another embodiment of the present invention is there shown and illustrates a variable flow ULV chemical delivery system 10 able to atomize droplets from a variable liquid formulation on a consistent basis attesting to its efficient design. FIG. 2 depicts the user interface 12 and the ULV cold fog generator 14, but further includes a closed-loading station 122, which supplies the storage receptacle 54 with the desired liquid for the ULV chemical delivery system 10.

The storage receptacle 54 comprises within the ULV cold fog generator is designed to integrate with a dry-lock tank fitting, such as, one made from polypropylene. The storage receptacle 54 is additionally fitted with a tank vent 98, which is located in the cap of the storage receptacle 54. However, for open port chemical loading, the tank vent 98 is otherwise unnecessary.

The storage receptacle 54 is equipped with a volume sensor 102, which is connected to both the liquid level gage 100 and the controller 20 by way of an analog to digital converter and control lines 124. Similar to the determination of the gas level of the fuel tank 70 of the engine 38, the controller 20 continually communicates with the liquid volume sensor 102, which measures the liquid volume of the storage receptacle 54. The measured liquid volume commuted to the controller 20 is relayed to the user interface 12, which in turn, displays a visual liquid level reading to the operator. The operator can also determine the liquid volume level of the storage receptacle 54 by reading the liquid level gage 100, which is located about the storage receptacle 54.

The ability to measure and display the volumes of both fuel and liquid on the user interface 12 located within the vehicle cab has direct benefits in the chemical loading process such as knowing the existing liquid volume of the storage receptacle 54 in real-time. In order to have a closed chemical loading system, one must have the ability to know when the storage receptacle 54 is full and be capable of controlling the ULV chemical delivery system 10 to turn the system off when it becomes full or when an unsafe condition exists.

During the closed-transfer of liquid, an "external pumping station" 126 as shown in FIG. 2, is utilized to transfer liquid from a source liquid container 134 to the storage receptacle 54 of the ULV cold fog generator 14. The external pumping station 126 includes a transfer pump enclosed in a weather tight housing and a transfer hose 128, which extends from the external pumping station 126, through valve 140, to a dry-lock liquid connector 130. Prior to initiating the liquid transfer from the external pumping station 126, the dry-lock liquid connector 130 of the transfer hose 128 is mated to the dry-lock liquid receptacle 132 located on the storage receptacle 54 of the ULV cold fog generator 14. Once mated, the dry-lock liquid connector 130 and storage receptacle 54 create a sealed connection between the external pumping station 126 and the storage receptacle 54.

Prior to the liquid transfer, the operator may enter a volume quantity, a percentage of the storage receptacle capacity, or may elect to select the "fill-up" mode into the user interface 12. During the "fill-up" mode, the controller 20 and the liquid volume sensor 102 are in constant communication, which provides the controller 20 a real-time liquid volume level of the storage receptacle 54. As such, the external pumping station continuously pushes liquid to the storage receptacle 54 until the liquid volume sensor 102 relays a real-time volume to the controller 20, which corresponds to a "full" storage receptacle 54. The controller 20 then halts liquid flow from the external pumping station 126, thereby, halting liquid flow to the storage receptacle 54.

Once the sealed connection is established, the operator of the ULV chemical delivery system will enter an amount of liquid desired to be transferred from the source liquid container 134 to the storage receptacle 54. Similar to the discussion above, the user interface communicates with the controller 20, which will measure the existing liquid volume in the storage receptacle 54, using the liquid volume sensor 102, to ascertain whether the amount of liquid desired by the operator will fit within the remaining volume of the storage receptacle 54. If the liquid amount entered by the operator fits within the remaining volume of the storage receptacle 54 or if the operator selects the "fill-up" mode, the controller 20 on the ULV cold fog generator 14 will command the external pumping station 126, via control line 136, to activate the external pumping station 126. Once the external pumping station is activated, the liquid is drawn from the source liquid container 134 via the external pump supply line 138 and draw liquid through the external pumping station 126. Upon exiting the external pumping station 126 and flowing through the transfer hose 128, the transfer liquid flows through the mated dry-lock connector and receptacle and into storage receptacle 54. The controller will continue to control the activation of the external pumping station 126 and the liquid flow therefrom, until the desired volume is met or the storage receptacle 54 is full. Thereafter, the controller 20 will promptly turn off the external pumping station 126.

If the external pumping station 126 is commanded to turn on by the controller 20 of the ULV cold fog generator 14 and the controller 20 does not detect a change in the volume of the storage receptacle 54 or the liquid flow to the storage receptacle is below and anticipated liquid flow rate within a predetermined amount of time, the controller 20 will turn off the external pumping station 126 and notify the operator through the user interface 12 that a failure has occurred in the external pumping station 126 or that the source container 134 is empty. The ULV chemical delivery system 10 will also turn off the external pumping station 126 when the storage receptacle 54 is full to prevent a spill similar to that of a fuel nozzle on a gasoline station pump.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only three of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiments of the present invention have been disclosed. A person of ordinary skill in the art would realize however, that certain modifications would come within the teachings of this invention. Therefore, the following claims should be studied to determine the true scope and content of the invention.

The invention claimed is:

1. A method for calibrating a pump in a closed system, the method comprising:
   providing a pump in communication with a storage receptacle, a nozzle, a transparent calibration tank, and a valve manifold having a plurality of diverter valves;
   de-energizing a first diverter valve for establishing a positive liquid flow from said storage receptacle to said pump, through said first diverter valve and then back to said storage receptacle;
   de-energizing a second diverter valve for diverting said positive liquid flow from said pump to said transparent calibration tank thereby defining a liquid volume therein;
   maintaining said positive liquid flow to said transparent calibration tank for a time period;
   energizing said second diverter valve for diverting said positive liquid flow from said pump to said storage receptacle at the end of said time period;
   reading said liquid volume defined in and visually recognizable through said transparent calibration tank;
   recording said liquid volume into a user interface; and
   de-energizing a third diverter valve for diverting said liquid volume from said transparent calibration tank to said pump.

2. The method according to claim 1, wherein said method further comprising the step of:
   energizing said third diverter valve for diverting said positive liquid flow from said storage receptacle to said pump.

3. The method according to claim 2, wherein said method further comprising the step of:
   energizing said first diverter valve for diverting said positive liquid flow from said pump to said nozzle.

4. The method according to claim 1, wherein said liquid reading step including visually sensing an amount of liquid delivered to said transparent cylinder from said storage receptacle.

5. The method according to claim 1, wherein said plurality of diverter valves are 3-way diverter spool valves.

* * * * *